Aug. 10, 1926.

R. B. FAGEOL 1,595,391

BUMPER FOR AUTOMOBILES

Filed Feb. 18, 1925

INVENTOR.
Rollie B. Fageol.
BY Dewey, Strong
Townsend & Loftus
ATTORNEYS.

Patented Aug. 10, 1926.

1,595,391

UNITED STATES PATENT OFFICE.

ROLLIE B. FAGEOL, OF LOS ANGELES, CALIFORNIA, ASSIGNOR TO AMERICAN CHAIN COMPANY, INC., OF BRIDGEPORT, CONNECTICUT, A CORPORATION OF NEW YORK.

BUMPER FOR AUTOMOBILES.

Application filed February 18, 1925. Serial No. 9,979.

This invention relates to a bumper for automobiles.

It is the principal object of the present invention to provide an automobile bumper which may be supported transversely of the end of an automobile, and which is particularly designed to afford additional protection to the fenders or mud guards of the automobile, as compared with bumpers now on the market.

The present invention contemplates the use of a transversely extending and horizontally disposed impact bar supported by suitable arms or brackets from the frame of an automobile, said impact bar terminating in end portions extending substantially parallel to the frame of the automobile and overhanging the fenders or mud guards in a manner to interpose a guard section between the outer edge of the fender and any object with which said fender might come in contact.

The invention is illustrated by way of example in the accompanying drawings, in which.

Referring more particularly to the drawings, 10 and 11 indicate the side frame members of an automobile main frame, and are here shown as supported by springs 12 upon a rear axle 13. It is to be understood that while the invention here disclosed is shown as applied to the rear of an automobile, that it may also be applied to the front of an automobile without difficulty.

Carried by the frame members 10 and 11 are fenders 14 and 15 respectively which serve as fenders and mud guards for the wheels of the vehicle, indicated by dotted lines at 16.

It is the purpose of an automobile bumper to interpose between the automobile upon which the bumper is mounted and some object with which the automobile comes in forcible contact, a structure which will absorb the force of impact and will through a prolonged period of time act to bring the vehicle and the colliding body into a relative state of rest. This may be satisfactorily done by the use of a bumper of the design shown in Hoover Patent No. 1,191,306, typifying the general bumper structures of Figs. 4 and 5 of the drawings, and Fageol Patent No. 1,329,517, typified by the structures shown in Figs. 2 and 3 of the drawings.

Figure 1:
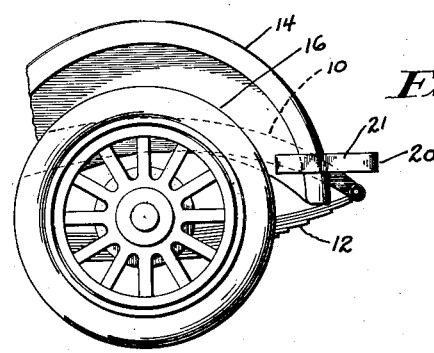
Fig. 1 is a fragmentary view of one end of an automobile frame showing the vehicle wheel, one of the fenders designed therefor, and the bumper with which the present invention is concerned mounted upon the vehicle frame and in position relative to the fender.
Figure 2:
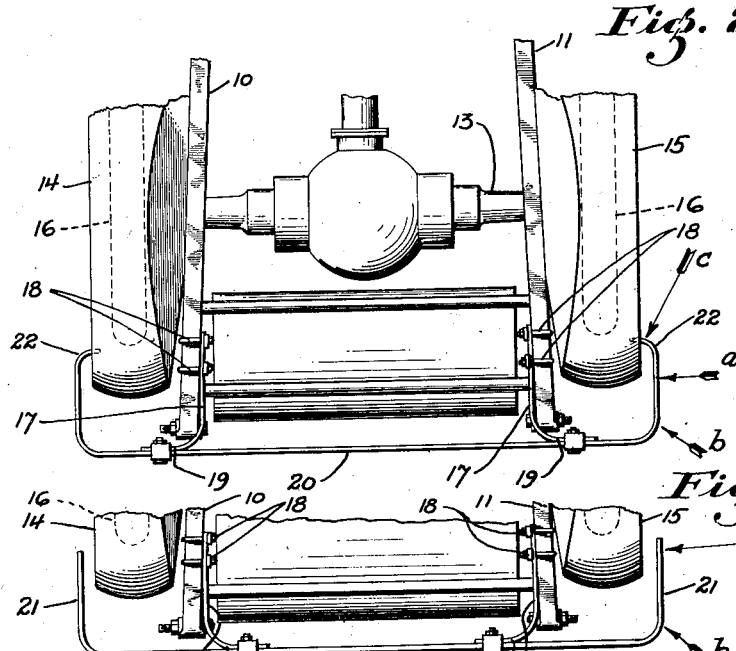
Fig. 2 is a fragmentary view showing the rear end of an automobile chassis with its rear fenders, and further showing one form of the present invention in which the terminating free ends of the impact member are recurved to hook around the outer edge of the fender and to form a curved fender section to prevent an object from hooking under the fender as the automobile advances.
Figure 3:
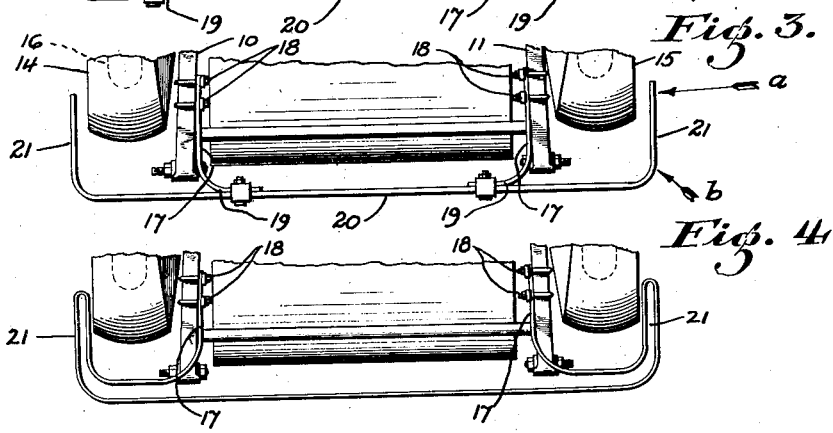
Fig. 3 is a fragmentary view of the rear of an automobile showing a simplified form of the bumper with the recurved hooks eliminated.

In Figs. 2 and 3 of the drawings, it will be seen that the bumper there shown comprises a pair of brackets or mounting arms 17 having means at their front ends for fastening them to the frame of the vehicle, such as the U bolts 18, and which brackets terminate in outwardly or inwardly bent portions 19 for receiving a horizontal bumper bar 20 supported transversely of the vehicle frame by the brackets.

In the form of the invention shown in Figs. 2 and 3, this bumper bar is a straight bar of resilient material terminating in end guard portions 21. These guard portions extend substantially at right angles to the main body of the bar and substantially parallel to the brackets 19. The length of the guard portions 21 is sufficient to carry their terminating ends forwardly of the rear edge of an automobile rear fender and rearwardly of the forward edge of an automobile front fender.

It will therefore be evident that in case a collision is liable to take place between the automobile upon which the bumper is mounted and another object, either in the direction of the arrow —a— or —b—, as indicated in Fig. 2, the fender will be shielded and thus protected, and that in the event the bumper is struck in any point intermediate its two ends, it will tend to yield to absorb the shock through the resilience of the bumper bar as well as the brackets. If, however, the fender should tend to collide with an object which would strike it in the direction of the arrow —c—, as indicated in Fig. 2, the form of bumper shown in Fig. 3 would not ward off the blow. This, however, has been taken care of in the form of bumpers shown in Figs. 2 and 5, in that the terminating ends of the guards 21 are curved inwardly as indicated at 22 and hooked around the edge of flange of the fender to prevent the fender from being struck.

Figure 4:
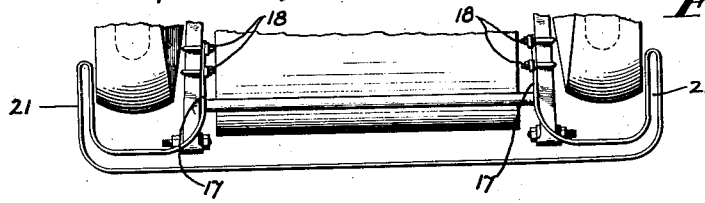
Fig. 4 is a fragmentary view of the rear end of an automobile showing a form of the invention in which the bumper is designed with full looped ends, the loops terminating at opposite sides of the vehicle frame and alongside of the fenders.
Figure 5:
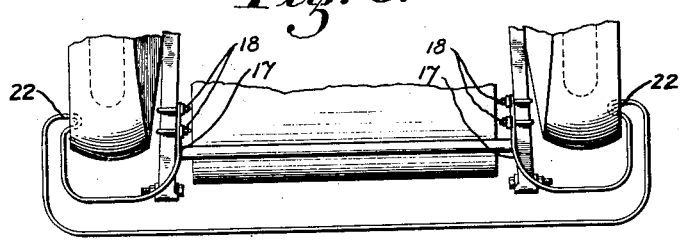
Fig. 5 is a fragmentary view of the rear end of an automobile showing the same design of bumper as disclosed in Fig. 1 formed with full loop ends.

In the form of the invention shown in Figs. 4 and 5, the bumpers are of the closed loop type, as exemplified in the patent to Hoover No. 1,191,306, issued July 18, 1916, in which the brackets 17 are formed as continuations of the complete bumper structure. The loops, however, continue around the sides of the fenders forming the side guards 21, and in the design of bumper shown in Fig. 5, the end of the loop is bent inwardly to form a looped hook 22.

In all forms of the invention here shown, it will be evident that the bumper will protect the complete rear of the automobile including its fenders from collision directly against the rear at the corners of the frame or at the sides of the fenders.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A bumper comprising a resilient horizontally disposed and horizontally yielding impact bar, mounting means for securing said impact bar to the frame of a vehicle and transversely of the end thereof, and resilient horizontally yielding extensions carried by the opposite ends of the impact bar and projecting along the sides of the frame to protect the fenders carried by the frame said extensions terminating in free ends.

2. In combination with the frame of an automobile and the side fenders carried thereby, a vertically rigid and horizontally resilient bumper comprising a horizontally extending impact bar, mounting arms for rigidly securing said impact bar transversely of the end of the vehicle frame, and extensions formed as continuations of the opposite ends of the impact bar and projecting substantially at right angles to said bar for guarding the sides of the adjacent automobile fenders, said extensions terminating in free ends.

3. In combination with the frame of an automobile and the side fenders carried thereby, a bumper comprising a horizontally extending impact bar, mounting arms for securing said impact bar transversely of the end of the vehicle frame, and extensions formed as continuations of the opposite ends of the impact bar and projecting substantially at right angles to said bar for guarding the sides of the adjacent automobile fenders, said extensions terminating in free end inturned hooks embracing the outer edges of said fenders.

4. In combination with an automobile frame and the fenders carried thereby, a bumper comprising a horizontally disposed impact member adapted to be positioned transversely of the end of the vehicle frame, the ends of said impact member terminating in loops formed to extend at right angles to the impact bar and along the outer sides of the adjacent vehicle fenders, and mounting means for supporting said bar with its loops in position across the end of the fenders.

5. In combination with an automobile frame and the fenders carried thereby, a bumper comprising a horizontally disposed impact member adapted to be positioned transversely of the end of the vehicle frame, the ends of said impact member terminating in loops formed to extend at right angles to the impact bar and along the outer sides of the adjacent vehicle fenders, mounting means for supporting said bar with its loops in position across the end of the fenders, and means formed at the terminals of said loops for hooking around the edges of the adjacent fenders.

ROLLIE B. FAGEOL.